US012597604B2

(12) United States Patent
Takahashi et al.

(10) Patent No.: US 12,597,604 B2
(45) Date of Patent: Apr. 7, 2026

(54) NONAQUEOUS ELECTROLYTE SECONDARY BATTERY

(71) Applicant: Panasonic Corporation, Kadoma (JP)

(72) Inventors: Keiichi Takahashi, Hyogo (JP); Fumiharu Niina, Hyogo (JP); Shinya Suzuki, Hyogo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 702 days.

(21) Appl. No.: 17/637,723

(22) PCT Filed: Aug. 25, 2020

(86) PCT No.: PCT/JP2020/031920
§ 371 (c)(1),
(2) Date: Feb. 23, 2022

(87) PCT Pub. No.: WO2021/039751
PCT Pub. Date: Mar. 4, 2021

(65) Prior Publication Data
US 2022/0285678 A1     Sep. 8, 2022

(30) Foreign Application Priority Data

Aug. 30, 2019     (JP) ................................. 2019-157613

(51) Int. Cl.
*H01M 4/525*          (2010.01)
*H01M 4/02*           (2006.01)
(Continued)

(52) U.S. Cl.
CPC ........... *H01M 4/525* (2013.01); *H01M 4/505* (2013.01); *H01M 10/0525* (2013.01); *H01M 2004/021* (2013.01); *H01M 2004/028* (2013.01)

(58) Field of Classification Search
CPC ...... H01M 4/525; H01M 4/505; H01M 4/364; H01M 4/366; H01M 4/131;
(Continued)

(56) References Cited

U.S. PATENT DOCUMENTS

2004/0201948 A1     10/2004  Hosoya et al.
2009/0305136 A1     12/2009  Yada et al.
(Continued)

FOREIGN PATENT DOCUMENTS

JP          2004-253305 A       9/2004
JP          2004-319105 A      11/2004
(Continued)

OTHER PUBLICATIONS

International Search Report dated Nov. 10, 2020, issued in counterpart International Application No. PCT/ JP2020/031920, with English Translation (6 pages).
(Continued)

*Primary Examiner* — Allison Bourke
*Assistant Examiner* — Travis L. Martin
(74) *Attorney, Agent, or Firm* — WHDA, LLP

(57) ABSTRACT
A nonaqueous electrolyte secondary battery according to the present invention comprises a positive electrode that contains, as positive electrode active materials: a lithium transition metal composite oxide (A) that is configured of secondary particles, in each of which primary particles having an average particle diameter of 0.5 μm or more aggregate, or is configured of substantially one kind of particles, while having a volume-based D50 of from 0.6 μm to 3 μm; and a lithium transition metal composite oxide (B) that is configured of secondary particles, in each of which primary particles having an average particle diameter of 0.3 μm or less aggregate, while having a volume-based D50 of from 6 μm to 25 μm.

6 Claims, 2 Drawing Sheets

(51) Int. Cl.
    *H01M 4/505*        (2010.01)
    *H01M 10/0525*     (2010.01)

(58) Field of Classification Search
    CPC ....... H01M 10/0525; H01M 2004/021; H01M
              2004/028; C01G 53/006; C01G 53/50;
              C01P 2002/52; C01P 2002/54; C01P
           2004/45; C01P 2004/51; C01P 2004/61;
             C01P 2004/62; C01P 2004/80; C01P
                        2006/40; Y02E 60/10
    See application file for complete search history.

(56)                 References Cited

U.S. PATENT DOCUMENTS

| | | |
|---|---|---|
| 2010/0221609 A1 | 9/2010 | Konishi et al. |
| 2017/0309898 A1 | 10/2017 | Hong |
| 2018/0026268 A1* | 1/2018 | Kim ..................... C01G 53/006 |
| | | 429/223 |
| 2019/0044135 A1* | 2/2019 | Du ........................ H01M 4/621 |
| 2019/0074512 A1* | 3/2019 | Choi ..................... H01M 4/366 |
| 2020/0266438 A1* | 8/2020 | Han ...................... H01M 4/366 |
| 2020/0388830 A1 | 12/2020 | Lee et al. |
| 2021/0013508 A1 | 1/2021 | Kuroda |
| 2022/0077450 A1 | 3/2022 | Jang et al. |
| 2022/0285678 A1 | 9/2022 | Takahashi et al. |

FOREIGN PATENT DOCUMENTS

| | | | |
|---|---|---|---|
| JP | 2006-54159 | A | 2/2006 |
| JP | 2007-265668 | A | 10/2007 |
| JP | 2009-224307 | A | 10/2009 |
| JP | 2013-137947 | A | 7/2013 |
| JP | 2013-187033 | A | 9/2013 |
| JP | 2018-505508 | A | 2/2018 |
| JP | 2019-160571 | A | 9/2019 |
| KR | 10-2018-0066623 | A | 6/2018 |
| KR | 10-2019-0093453 | A | 8/2019 |
| WO | 2017/057078 | A1 | 4/2017 |

OTHER PUBLICATIONS

Office Action dated Dec. 22, 2023, issued in counterpart CN Application No. 202080059342.4, with partial Engish translation. (13 pages).

Kim et al., "Three-dimensional SWCNT and MWCNT hybrid networks for extremely high-loading and high rate cathode materials", Journal of Materials Chemistry A, 2019, vol. 7, pp. 17412-17419, cited in Non-Final Office Action dated Dec. 9, 2022. (18 pages).

Non-Final Office Action dated Dec. 9, 2022, issued in U.S. Appl. No. 17/198,878. (22 pages).

Final Office Action dated Apr. 14, 2023, issued in U.S. Appl. No. 17/198,878. (12 pages).

The Extended European Search Report dated Sep. 12, 2022, issued in counterpart to EP Application No. 20858407.8. (10 pages).

\* cited by examiner

NONAQUEOUS ELECTROLYTE SECONDARY BATTERY

CROSS-REFERENCE TO RELATED APPLICATIONS

This application is a national stage of International Application No. PCT/JP2020/031920, filed Aug. 25, 2020, which claims priority to Japanese Patent Application No. 2019-157613 filed Aug. 30, 2019 both of which are hereby incorporated by reference in their entirety.

TECHNICAL FIELD

The present disclosure generally relates to a non-aqueous electrolyte secondary battery.

BACKGROUND ART

In recent years, a lithium-transition metal composite oxide with a high Ni content has attracted attention as a positive electrode active material with a high energy density. Patent Literature 1, for example, discloses a non-aqueous electrolyte secondary battery including a composite oxide, as a positive electrode active material, formed of single crystal primary particles mainly composed of Ni and Li, represented by the general formula $Li_xNi_{1-p-q-r}Co_pAl_qA_rO_{2-y}$, and having an average particle diameter of 2 μm to 8 μm. Patent Literature 1 describes characteristics of the positive electrode active material as a low reactivity with an electrolyte liquid, a low internal resistance with using as a battery, and a resistance to pressure during a formation of the positive electrode.

CITATION LIST

Patent Literature

PATENT LITERATURE 1: Japanese Unexamined Patent Application Publication No. 2006-54159

SUMMARY

Non-aqueous electrolyte secondary batteries such as lithium ion batteries may cause particle cracking of a positive electrode active material associated with charging and discharging, leading to lowered battery capacity. In particular, batteries having a high energy density are likely to cause the particle cracking, and difficult to achieve excellent charge-discharge cycle characteristics. The art disclosed in Patent Literature 1 has still a room for improvement in the charge-discharge cycle characteristics.

An object of the present disclosure is to improve charge-discharge cycle characteristics of a non-aqueous electrolyte secondary battery including a lithium-transition metal composite oxide with a high Ni content as a positive electrode active material.

A non-aqueous electrolyte secondary battery of an aspect of the present disclosure comprises: a positive electrode including a positive electrode active material; a negative electrode; and a non-aqueous electrolyte, wherein the positive electrode includes: a lithium-transition metal composite oxide (A) having a median diameter on a volumetric basis of 0.6 μm to 3 μm and being a secondary particle formed by aggregation of primary particles having an average particle diameter of 0.5 μm or larger or being composed of substantially single particles; and a lithium-transition metal composite oxide (B) having a median diameter on a volumetric basis of 6 μm to 25 μm and being a secondary particle formed by aggregation of primary particles having an average particle diameter of 0.3 μm or smaller, as the positive electrode active material. The lithium-transition metal composite oxide (A) contains 65 mol % or more of Ni based on a total number of moles of metal elements excluding Li. The lithium-transition metal composite oxide (B) contains 70 mol % or more of Ni based on a total number of moles of metal elements excluding Li, and Ti is present on a particle surface of the oxide. In the lithium-transition metal composite oxide (B), when particles having a particle diameter larger than a 70% particle diameter (D70) on a volumetric basis are defined as first particles, and particles having a particle diameter smaller than a 30% particle diameter (D30) on a volumetric basis are defined as second particles, a mole fraction of Ti based on a total number of moles of metal elements excluding Li on surfaces of the second particles (B2) is larger than a mole fraction of Ti based on a total number of moles of metal elements excluding Li on surfaces of the first particles (B1).

The non-aqueous electrolyte secondary battery according to the present disclosure has a high energy density and excellent charge-discharge cycle characteristics.

DESCRIPTION OF EMBODIMENTS

The present inventors have made intensive investigation to solve the above problem, and as a result, have successfully achieved both of the high energy density and the excellent charge-discharge cycle characteristics by using lithium-transition metal composite oxides (A) and (B) in combination and, in the composite oxide (B), by setting a mole fraction of Ti on surfaces of the second particles having a smaller particle diameter to be larger than a mole fraction of Ti on surfaces of the first particles having a larger particle diameter. It is considered that the composite oxide (A), which has a smooth particle surface, relaxes a pressure during a rolling of a positive electrode mixture layer and a stress due to a change in volume of the mixture layer during charge and discharge, and the mixture layer may be efficiently filled with each composite oxide. Therefore, cracking of the composite oxide particles may be inhibited, and a density of the mixture layer may be increased.

From smaller particles such as the second particles, a metal constituting a composite oxide are more likely to be eluted during charge and discharge than from larger particles such as the first particles, and the metal elution is presumed to be a cause of the lowering in capacity associated with charging and discharging. In the non-aqueous electrolyte secondary battery according to the present disclosure, it is considered that the larger amount of Ti present on the surfaces of the smaller particles may inhibit the metal elution to result in achieving the high energy density and the excellent charge-discharge cycle characteristics by a synergistic effect with the above relaxation effect.

Hereinafter, an example of an embodiment of a non-aqueous electrolyte secondary battery according to the present disclosure will be described in detail. Hereinafter, a cylindrical battery in which a wound electrode assembly 14 is housed in a bottomed cylindrical exterior housing can 16 will be exemplified, but an exterior housing body is not limited to a cylindrical exterior housing can and may be, for example, a rectangular exterior housing can and may be an exterior housing body constituted of laminated sheets including a metal layer and a resin layer. The electrode assembly may be a stacked electrode assembly in which a plurality of positive electrodes and a plurality of negative electrodes are alternatively stacked with separators interposed therebetween.

Figure 1:
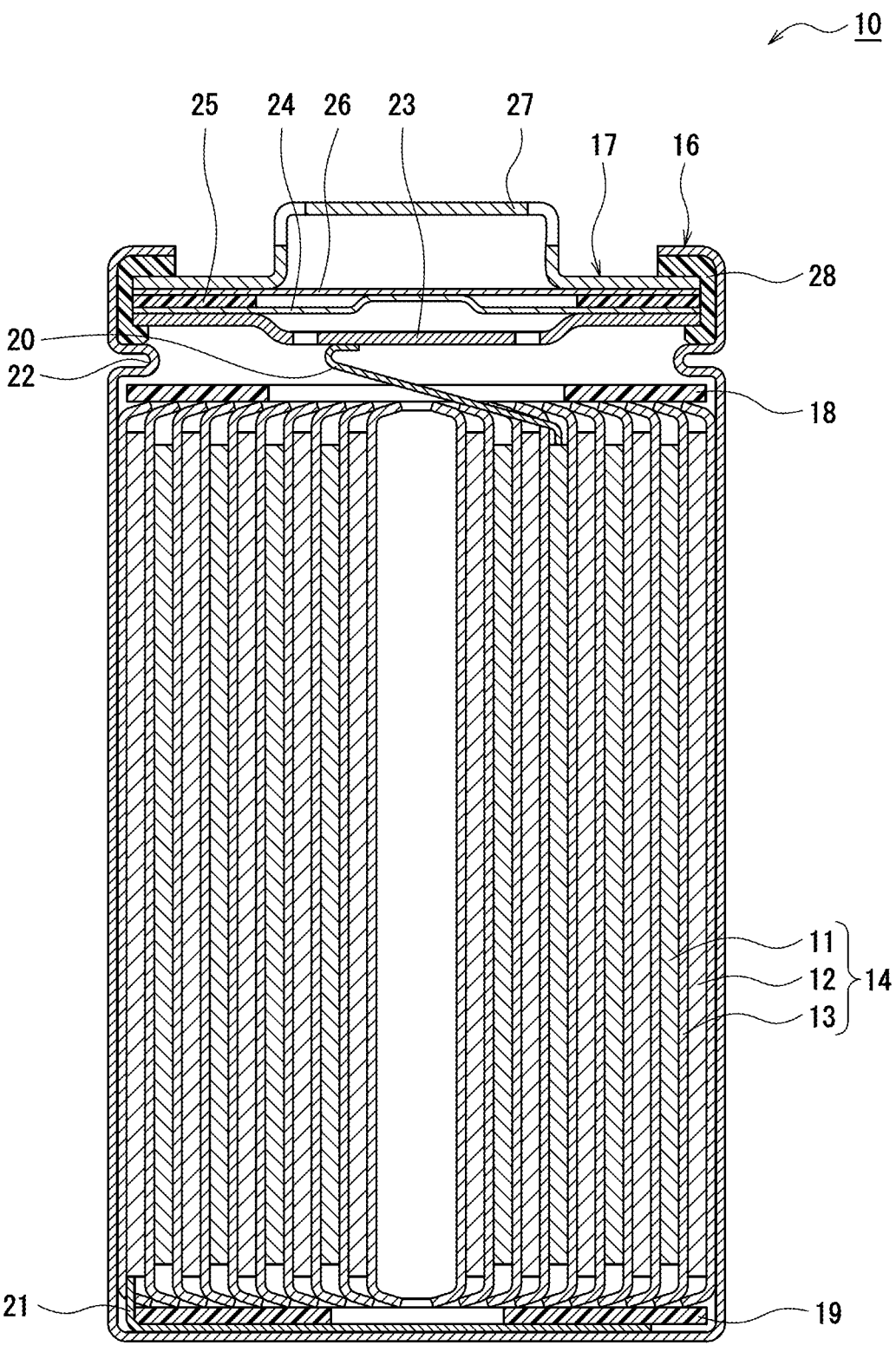
FIG. 1 is a sectional view of a non-aqueous electrolyte secondary battery of an example of an embodiment.

FIG. 1 is a sectional view of a non-aqueous electrolyte secondary battery 10 of an example of an embodiment. As exemplified in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted solvent in which at least some hydrogens in these solvents are substituted with halogen atoms such as fluorine. For the electrolyte salt, a lithium salt such as $LiPF_6$ is used, for example. The electrolyte is not limited to a liquid electrolyte, and may be a solid electrolyte using a gel polymer or the like.

Any of the positive electrode 11, negative electrode 12, and separator 13 constituting the electrode assembly 14 is a band-shaped elongated body, and spirally wound to be alternatively stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a grooved part 22 in which a part of a side part thereof projects inside for supporting the sealing assembly 17 is formed. The grooved part 22 is preferably formed in a circular shape along a circumferential direction of the exterior housing can 16, and supports the sealing assembly 17 with the upper surface thereof. The sealing assembly 17 is fixed on the upper part of the exterior housing can 16 with the grooved part 22 and with an end part of the opening of the exterior housing can 16 calked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected each other. The lower vent member 24 and the upper vent member 26 are connected at each of central parts thereof, and the insulating member 25 is interposed between each of the circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, negative electrode 12, and separator 13, which constitute the electrode assembly 14, particularly the positive electrode active material constituting the positive electrode 11, will be described in detail.

[Positive Electrode]

Figure 2:
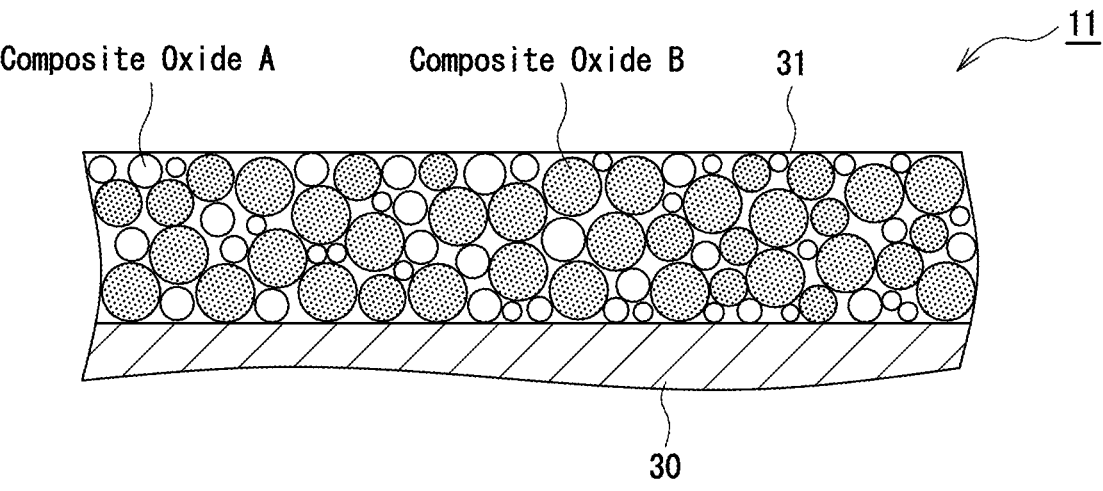
FIG. 2 is a sectional view of a positive electrode of an example of an embodiment.

FIG. 2 is a view illustrating a part of a cross section of the positive electrode 11. As exemplified in FIG. 2, the positive electrode 11 has a positive electrode core 30 and a positive electrode mixture layer 31 provided on a surface of the positive electrode core 30. For the positive electrode core 30, a foil of a metal stable within a potential range of the positive electrode 11, such as aluminum, a film in which such a metal is disposed on a surface layer thereof, and the like may be used. The positive electrode mixture layer 31 includes a positive electrode active material, a binder, and a conductive agent, and is preferably provided on both surfaces of the positive electrode core 30 except for a portion to which the positive electrode lead 20 is connected. The positive electrode 11 may be produced by, for example, applying a positive electrode mixture slurry including the positive electrode active material, the binder, the conductive agent, and the like on the surface of the positive electrode core 30, drying and subsequently compressing the applied film to form the positive electrode mixture layers 31 on both the surfaces of the positive electrode core 30.

Examples of the conductive agent included in the positive electrode mixture layer 31 may include a carbon material such as carbon black, acetylene black, Ketjenblack, and graphite. Examples of the binder included in the positive electrode mixture layer 31 may include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination.

The positive electrode 11 includes a lithium-transition metal composite oxide (A) having a median diameter (D50) on a volumetric basis of 0.6 μm to 3 μm and a lithium-transition metal composite oxide (B) having D50 of 6 μm to 25 μm, as the positive electrode active material (hereinafter, the lithium-transition metal composite oxides (A) and (B) are simply referred to as "composite oxides (A) and (B)"). The positive electrode active material of the present embodiment includes only the composite oxides (A) and (B), but the positive electrode mixture layer 31 may include a composite oxide other than the composite oxides (A) and (B) or another compound within a range in which an object of the present disclosure is not impaired.

The median diameter (D50) on a volumetric basis, also referred to as a median diameter, means a particle diameter at which a cumulative frequency is 50% from a smaller particle diameter side in a particle size distribution on a volumetric basis. The particle diameter and particle size distribution of the composite oxide may be measured by using a laser diffraction-type particle size distribution measuring device (for example, MT3000II, manufactured by MicrotracBEL Corp.) with water as a dispersion medium.

The composite oxide (A) is a composite oxide particle being a secondary particle formed by aggregation of primary particles having a large average particle diameter of 0.5 μm or larger or being composed of substantially single particles. The composite oxide (A) composed of substantially single particles means particles in which no particle boundary of the primary particles is observed by using a scanning electron microscope (SEM) with an appropriate magnification. When the composite oxide (A) is a secondary particle, an average particle diameter of the primary particles is 0.5 μm to 3 μm. The composite oxide (B) is a secondary particle formed by aggregation of primary particles having a small average particle diameter of, for example, 0.3 μm or smaller.

When the composite oxide (A) is a secondary particle, a particle boundary of the primary particles is observed on the particle cross section observed with a SEM. The composite oxide (A) is, for example, composed of 100 or less, several to tens of, or, for example, 2 to 5 primary particles, and the composite oxide (B) is composed of 10000 to 5000000 primary particles. Particle diameters of the primary particles are measured as Feret's diameter of a region surrounded by the particle boundary (primary particle) on a SEM image of the particle cross section of the composite oxide. The average particle diameter of the primary particles is calculated by averaging particle diameters of 100 primary particles.

The composite oxide (A) contains 65 mol % or more of Ni based on the total number of moles of metal elements excluding Li. The composite oxide (B) contains 70 mol % or more of Ni based on the total number of moles of metal elements excluding Li. A battery having a high energy density may be obtained by using a positive electrode active material with a high Ni content rate. The Ni content rate in the composite oxide (A) may be lower than the Ni content rate in the composite oxide (B). Ti is present on at least a particle surface of the composite oxide (B).

The composite oxides (A) and (B) may contain a meal element other than Li, Ni, and Ti. Example of the metal element may include Co, Mn, Al, Zr, B, Mg, Fe, Cu, Zn, Sn, Na, K, Ba, Sr, Ca, W, Mo, Nb, and Si. A preferable example of the composite oxide (A) and (B) is a composite oxide represented by the general formula $Li_aNi_bCo_cMn_dTi_eO_f$ (in the formula, $0.8 \leq a \leq 1.2$, $b \geq 0.70$, $c \leq 0.10$, $0.03 \leq d \leq 0.12$, $0.01 \leq e \leq 0.05$, $1 \leq f \leq 2$ and $b+c+d+e=1$).

Compositions of the composite oxides (A) and (B) may differ from each other. The composite oxide (A) may or may not contain Ti. On the other hand, the composite oxide (B) contains Ti, and a mole fraction of Ti based on the total number of moles of metal elements excluding Li (a rate of number of mole of Ti) is preferably 0.01 to 0.05. Ti is present on the surface of the secondary particle of the composite oxide (B), and also present on surfaces of the primary particles. A part of Ti may also be present inside the primary particles to form a solid solution with another metal element contained in the composite oxide (B).

The particle surface of the composite oxide (A) is smoother than the particle surface of the composite oxide (B). The circularity of the composite oxide (A) is not limited, but preferably 0.9 or less. The circularity may be calculated with the following formula from a particle image taken with irradiating a sample flow including particles of the composite oxide with stroboscopic light.

$$Circularity = (Circumference\ Length\ of\ Circle\ having\ Area\ Same\ as\ Particle\ Image)/(Circumference\ Length\ of\ Particle\ Image)$$

On the particle surface of the composite oxide (A), compounds such as, for example, boron oxide, may be present in a form without impairing the smoothness on the particle surface, for example, as a thin cover layer.

The compressive strength of the composite oxide (A) may be, for example, 250 MPa or higher or 350 MPa or higher. In this case, the particle cracking due to charge and discharge is inhibited, resulting in contribution to improvement in the charge-discharge cycle characteristics comparing with a case not satisfying the above range. An upper limit of the compressive strength of the composite oxide (A) is not limited, and, for example, 1500 MPa or lower. The compressive strength of the composite oxide (A) is measured with a method specified in JIS-R1639-5.

The composite oxide (A) may be produced by, for example, the following procedure.

First, a lithium compound such as lithium hydroxide and an oxide containing nickel and the above exemplified metal elements are mixed at a mixing ratio based on the composite oxide (A) of interest. At this time, a potassium compound is further added into the mixture. Then, the mixture containing the lithium compound, the oxide containing nickel and the metal elements, and the potassium compound or sodium compound is calcinated in the atmosphere or in an oxygen flow. Thereafter, the obtained calcinated product is washed with water to remove a potassium compound or sodium compound adhered to a surface of the calcinated product.

The composite oxide (A) is synthesized with the above method. A detailed theory of the enlargement of the particle diameter of the primary particles is not clear, but it is presumed that adding a potassium compound into the above mixture uniformly proceeds a growth of the single crystal particle in an entirety of the mixture phase during the calcination.

A calcinating temperature in the above step is, for example, 600° C. to 1050° C., and higher temperature tends to enlarge the primary particles. A calcinating time is approximately 1 to 100 hours when the calcination temperature is 600 to 1050° C. The composite oxide (A) may also be obtained by a crystal growth with an oxide having a low melting point such as Na and K, provided that the flux compound is removed by washing with water or the like. Examples of the potassium compound include a potassium hydroxide (KOH) and a salt thereof and potassium acetate. The potassium compound is added at an amount of, for example, 0.1 to 100 mass % or less based on the composite oxide (A) to be synthesized.

In the composite oxide (B), when particles having a particle diameter larger than a 70% particle diameter (D70) on a volumetric basis are defined as first particles, and particles having a particle diameter smaller than a 30% particle diameter (D30) on a volumetric basis are defined as second particles, a mole fraction of Ti based on the total number of moles of metal elements excluding Li on surfaces of the second particles (B2) is larger than a mole fraction of Ti based on the total number of moles of metal elements excluding Li on surfaces of the first particles (B1).

That is, the composite oxide (B) is particles having a ratio (B2/B1) of the mole fraction of Ti on the surfaces of the second particles (B2) to the mole fraction of Ti on the surface of the first particles (B1), of 1 or more. Using such a composite oxide (B) may inhibit the metal elution from the composite oxide during charge and discharge to result in obtaining a battery having a high energy density and excellent charge-discharge cycle characteristics by a synergistic effect with the composite oxide (A).

The D70 means a particle diameter at which a cumulative frequency is 70% from a smaller particle diameter side in a particle size distribution on a volumetric basis. Similarly, the D30 means a particle diameter at which the cumulative frequency is 30% from the smaller particle diameter side in the particle size distribution on a volumetric basis. For example, the D70 is 9 $\mu$m to 19 $\mu$m, and the D30 is 3 $\mu$m to 13 $\mu$m. The mole fraction of the metal elements present on the particle surface of the composite oxide (B) is measured by X-ray photoelectron spectroscopic analysis (XPS). The mole fraction of the metal elements in an entirety of the particles of the composite oxide (B) is measured by inductively coupled plasma (ICP) atomic emission spectroscopic analysis.

The D70 means a particle diameter at which a cumulative frequency is 70% from a smaller particle diameter side in a particle size distribution on a volumetric basis. Similarly, the D30 means a particle diameter at which the cumulative frequency is 30% from the smaller particle diameter side in the particle size distribution on a volumetric basis. For example, the D70 is 9 $\mu$m to 19 $\mu$m, and the D30 is 3 $\mu$m to 13 $\mu$m. B1 and B2 are mole fractions of Ti determined by X-ray photoelectron spectroscopic analysis (XPS). Setting a spot diameter of the X-ray irradiation to be 1 mm$\varphi$ or larger allows hundreds of the lithium-transition metal composite oxide particles to be included in the irradiation spot, and thus average values of the mole fractions of Ti on the surfaces of each of the first particles and the second particles, that is B1 and B2, may be measured.

As long as the mole fractions of the first particles and second particles measured by XPS satisfy the condition of B1<B2, the first particles may contain particles having a mole fraction of Ti on a particle surface thereof (B1) being the same as or larger than the mole fraction of the second particles (B2). The second particles may contain particles having a mole fraction of Ti on a particle surface thereof (B2) being smaller than the mole fraction of the first particles (B1). B1 is larger than 0, and Ti is present on both the surfaces of the first particles and the second particles.

The Ti is present mainly in a state of lithium titanate represented by $Li_xTi_yO_z$ on the particle surface of the composite oxide (B). In the formula, x, y, and z satisfy, for example, $1 \leq x \leq 4$, $1 \leq y \leq 5$, and $1 \leq z \leq 12$. As described later, Ti compounds such as titanium oxide ($TiO_2$) are used as a Ti source, and to be reacted with Li present on the particle surface during calcination to generate $Li_xTi_yO_z$.

The lithium titanate may be formed for coating an entirety of the surface of the secondary particle, or may be scatteringly present on the particle surfaces. When the lithium titanate is particles, a particle diameter thereof is typically smaller than the particle diameter of the primary particles constituting the composite oxide (B). The lithium titanate particles may be observed with an SEM. The lithium titanate is preferably adhered in a wide range without uneven distribution on a part of the surfaces of the primary particles constituting the composite oxide (B).

A ratio (B2/B1) of the mole fraction of Ti on the surfaces of the second particles (B2) to the mole fraction of Ti on the surfaces of the first particles (B1) is preferably 1.10 or more, more preferably 1.15 or more, and particularly preferably 1.20 or more. In particular, the lowering in capacity associated with charging and discharging may be more highly inhibited in the case of B2/B1$\geq$1.20. An upper limit of B2/B1 is not particularly limited, and for example, 1.50.

In the composite oxide (B), Ti may be present inside the primary particles to form a solid solution with a transition metal element such as Ni, as described above. A mole fraction of Ti based on the metal element forming the solid solution may be determined on a cross section of the primary particles by energy dispersive X-ray spectroscopy (EDS). In the composite oxide (B), a total number of moles of Ti in lithium titanate present in a state of the solid solution and on the surface is preferably 0.01 to 0.05 based on a total number of moles of metal elements excluding Li.

In the composite oxide (B), the second particles preferably have a larger ratio than the first particles, of the mole fraction of Ti present on the particle surface to a mole fraction of Ti in an entirety of the particles (mole fraction of Ti on the particle surface/mole fraction of Ti in an entirety of the particles). That is, the second particles contain more particles having a higher ratio mentioned above than that of the primary particles. In this case, the lowering in capacity associated with charging and discharging may be more highly inhibited.

The composite oxide (B) may be produced by, for example, the following procedure.

(1) Into each of two nickel compounds having different D50s and containing at least Ni and containing no Li nor Ti, Li sources such as lithium hydroxide are added, and the mixtures are calcined to synthesize lithium-nickel composite oxides (X1) and (X2) having different D50s. An example of the nickel compounds is a composite oxide or hydroxide containing Ni, Co, and Mn. At this time, one lithium-nickel composite oxide may be classified to obtain two lithium-nickel composite oxides having different D50s. For the classification, conventionally known methods may be used.

(2) Ti sources are added into each of the lithium-nickel composite oxides (X1) and (X2) to form composites of Ti on the particle surfaces, and then the composite oxides are calcined to obtain lithium-transition metal composite oxides (Y1) and (Y2). Thereafter, the composite oxides (Y1) and (Y2) are mixed to obtain the composite oxide (B). An example of the Ti sources is titanium oxide ($TiO_2$). For forming composites, a dry particle composing machine (for example, NOB-130, manufactured by HOSOKAWA MICRON CORPORA- TION) or the like is used. At this time, the Li source such as lithium hydroxide may be added in addition to the Ti source.

A calcinating temperature in the step (2) is, for example, 550° C. to 750° C. A lower temperature tends to generate a larger amount of lithium titanate on the surfaces of the primary particles, and tends to decrease the amount of the Ti solid solution. Setting the amount of Ti to be added to the smaller particles to be larger than the amount of Ti to be added to the larger particles may achieve the state of B1<B2. In addition, setting a calcination temperature for the smaller particles to be lower than a calcination temperature for the larger particles may also achieve the state of B1<B2.

As described above, the positive electrode active material is a mixture of the composite oxide (A) and the composite oxide (B). A content rate of the composite oxide (A) based on a mass of the positive electrode active material is, for example, 5 to 65 mass %, preferably 10 to 60 mass %, and particularly preferably 20 to 55 mass %. A content rate of the composite oxide (B) based on a mass of the positive electrode active material is, for example, 35 to 95 mass %, preferably 40 to 90 mass %, and particularly preferably 45 to 80 mass %.

A density of the positive electrode mixture layer 31 is preferably 3.55 g/cc or higher, and more preferably 3.60 g/cc or higher. The mixing ratio of the composite oxides (A) and (B) within the above range may improve a filling property of the particles to increase a filling density of the positive electrode mixture layer 31, and a battery having a high energy density and excellent charge-discharge cycle characteristics may be obtained.

[Negative Electrode]

The negative electrode 12 has a negative electrode core and a negative electrode mixture layer provided on a surface of the negative electrode core. For the negative electrode core, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on, for example, both surfaces of the negative electrode core except for a portion to which the negative electrode lead 21 is connected. The negative electrode 12 may be produced by, for example, applying a negative electrode mixture slurry including the negative electrode active material, the binder, and the like on the surface of the negative electrode core, drying and subsequently compressing the applied film to form the negative electrode mixture layers on both the surfaces of the negative electrode core.

The negative electrode mixture layer includes, for example, a carbon-based active material to reversibly occlude and release lithium ions, as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

[Separator]

For the separator 13, a porous sheet having an ion permeation property and an insulation property is used. Specific examples of the porous sheet include a fine porous thin film, a woven fabric, and a nonwoven fabric. As a material for the separator 13, a polyolefin such as polyethylene and polypropylene, cellulose, and the like are preferable. The separator 13 may have any of a single-layered structure and a multilayered structure. On a surface of the separator, a heat-resistant layer and the like may be formed.

EXAMPLES

Hereinafter, the present disclosure will be further described with Examples, but the present disclosure is not limited to these Examples.

Example 1

[Production of Composite Oxide A]

A nickel-cobalt-manganese composite hydroxide having D50 of 15 μm with a composition of $Ni_{0.8}Co_{0.1}Mn_{0.1}(OH)_2$ obtained by coprecipitation was calcinated at 500° C. to obtain a nickel-cobalt-manganese composite oxide (Z1).

Then, a lithium hydroxide and the nickel-cobalt-manganese composite oxide (Z1) were mixed so that a molar ratio between Li and the total amount of Ni, Co, and Mn was 1.05:1, and a potassium compound was added into this mixture at a rate of 20 mass % based on the Z1. This mixture was calcinated in an oxygen atmosphere at 750° C. for 72 hours, then crushed, and washed with water for removing a potassium compound to obtain a lithium composite oxide (Z2) to be the composite oxide A.

ICP analysis demonstrated that the composite oxide A has a composition of $Li_{1.01}Ni_{0.80}Co_{0.10}Mn_{0.10}O_2$. An average secondary particle diameter (D50) of the composite oxide A was 2.3 μm. A cross section of the composite oxide A after a CP processing was observed with a SEM, and as a result, an average primary particle diameter of the composite oxide A was 1.4 μm. In the composite oxide A, approximately 95% or more of all the particles had a single particle structure, and the remainder had a pseudo aggregating structure in which 3 to 10 or more primary particles were bonded.

[Production of Composite Oxide B]

A nickel-cobalt-manganese composite hydroxide having D50 of 14 μm with a composition of $Ni_{0.84}Co_{0.10}Mn_{0.005}$ $(OH)_2$ and a nickel-cobalt-manganese composite hydroxide having D50 of 10 μm with a composition of $Ni_{0.84}Co_{0.10}Mn_{0.06}(OH)_2$, obtained by coprecipitation, were separately calcinated at 500° C. to obtain a nickel-cobalt-manganese composite oxide having a larger average particle diameter (X1) and a nickel-cobalt-manganese composite oxide having a smaller average particle diameter (Y1).

Then, a lithium hydroxide and the nickel-cobalt-manganese composite oxide having a larger average particle diameter (X1) were mixed so that a molar ratio between Li and the total amount of Ni, Co, and Mn was 1.08:1. This mixture was calcinated in an oxygen atmosphere at 700° C. for 8 hours, and then crushed to obtain a lithium composite oxide having a larger average particle diameter (X2).

A lithium hydroxide and the nickel-cobalt-aluminum composite oxide having a smaller average particle diameter (Y1) were mixed so that a molar ratio between Li and the total amount of Ni, Co, and Al was 1.08:1. This mixture was calcinated in an oxygen atmosphere at 700° C. for 8 hours, and then crushed to obtain a lithium composite oxide having a smaller average particle diameter (Y2).

Next, the lithium composite oxide having a larger average particle diameter (X2) and a titanium oxide ($TiO_2$) were dry-mixed so that a molar ratio between the total amount of Ni, Co, and Mn, and Ti in $TiO_2$ was 1:0.02 to form a composite of Ti on the particle surface. This mixture was calcinated in an oxygen atmosphere at 700° C. for 8 hours, and then crushed to obtain a lithium composite oxide in which Ti was present on the particle surface (X3).

The lithium composite oxide having a smaller average particle diameter (Y2) and $TiO_2$ were dry-mixed so that a molar ratio between the total amount of Ni, Co, and Mn, and Ti in $TiO_2$ was 1:0.025 to form a composite of Ti on the particle surface. This mixture was calcinated in an oxygen atmosphere at 700° C. for 8 hours, and then crushed to obtain a lithium composite oxide in which Ti was present on the particle surface (Y3).

Ti present on the particle surface may be quantified by XPS, and Ti in a solid solution may be quantified by EDS. The presence of Ti in a state of lithium titanium oxide on the particle surface may be confirmed by XRD, XPS, XAFS, and the like.

The ratio (B2/B1) of the mole fraction of Ti on the surfaces of the second particles having a particle diameter smaller than D30 on a volumetric basis (B2) to the mole fraction of Ti on the surfaces of the first particles having a particle diameter larger than D70 on a volumetric basis (B1) was 1.25. The mole fraction of Ti of each of the first and second particles was determined by XPS.

ICP analysis demonstrated that the composite oxide B has a composition of $Li_{1.01}Ni_{0.81}Co_{0.10}Mn_{0.06}Ti_{0.02}O_2$. In a particle size distribution of the composite oxide B, the D50 was 12 μm, the D70 was 14 μm, and the D30 was 10 μm. A cross section of the composite oxide B after a CP processing was observed with a SEM, and as a result, an average primary particle diameter of the composite oxide B was 0.13 μm.

The lithium composite oxides (X3) and (Y3) were mixed at a mass ratio of 1:1, and the lithium composite oxide (Z2) was further mixed therewith to be an amount at 50 mass % based on the total mass of a positive electrode active material to be the positive electrode active material.

[Production of Positive Electrode]

The above positive electrode active material, acetylene black, and polyvinylidene fluoride (PVdF) were mixed at a solid-content mass ratio of 96.3:2.5:1.2, an appropriate amount of N-methyl-2-pyrrolidone (NMP) was added, and then the mixture was kneaded to prepare a positive electrode mixture slurry. This positive electrode mixture slurry was applied on both surfaces of a positive electrode core made of aluminum foil, the applied film was dried, and then rolled using a roller and cut to a predetermined electrode size to obtain a positive electrode in which the positive electrode mixture layer was formed on both the surfaces of the positive electrode core. An exposed part where a surface of the positive electrode core was exposed was provided at a part of the positive electrode.

[Production of Negative Electrode]

Natural graphite was used as the negative electrode active material. The negative electrode active material, carboxymethyl cellulose sodium salt (CMC-Na), and styrene-butadiene rubber (SBR) were mixed at a solid-content mass ratio of 100:1:1 in an aqueous solution to prepare a negative electrode mixture slurry. This negative electrode mixture slurry was applied on both surfaces of a negative electrode core made of copper foil, the applied film was dried, and then rolled using a roller and cut to a predetermined electrode size to obtain a negative electrode in which negative electrode mixture layer was formed on both the surfaces of the negative electrode core. An exposed part where a surface of the negative electrode core was exposed was provided at a part of the negative electrode.

[Preparation of Non-Aqueous Electrolyte]

Into a mixed solvent of ethylene carbonate (EC), ethyl methyl carbonate (EMC), and dimethyl carbonate (DMC) at a volume ratio of 3:3:4, lithium hexafluorophosphate ($LiPF_6$) was dissolved at a concentration of 1.0 mol/litter. Vinylene carbonate (VC) was further dissolved into the above mixed solvent at a concentration of 2.0 mass % to prepare a non-aqueous electrolyte liquid.

[Production of Battery]

An aluminum lead was attached to the exposed part of the positive electrode, a nickel lead was attached to the exposed part of the negative electrode, the positive electrode and the negative electrode were spirally wound with a separator made of polyolefin interposed therebetween, and then press-formed in the radial direction to produce a flat, wound electrode assembly. This electrode assembly was housed in an exterior housing body composed of an aluminum laminated sheet, the above non-aqueous electrolyte liquid was injected thereinto, and then an opening of the exterior housing body was sealed to obtain a non-aqueous electrolyte secondary battery having a designed capacity of 650 mAh.

Example 2

A non-aqueous electrolyte secondary battery was produced in the same manner as in Example 1 except that the lithium composite oxide having a smaller average particle diameter (Y2) and $TiO_2$ were mixed so that a molar ratio between the total amount of Ni, Co, and Mn, and Ti in $TiO_2$ was 1:0.023 in the production of the composite oxide B.

Example 3

A non-aqueous electrolyte secondary battery was produced in the same manner as in Example 1 except that the lithium composite oxide having a smaller average particle diameter (Y2) and $TiO_2$ were mixed so that a molar ratio between the total amount of Ni, Co, and Mn, and Ti in $TiO_2$ was 1:0.015 in the production of the composite oxide B.

Example 4

A non-aqueous electrolyte secondary battery was produced in the same manner as in Example 1 except that the composite oxide A was mixed to be an amount at 10 mass % based on the total mass of the positive electrode active material.

Example 5

A non-aqueous electrolyte secondary battery was produced in the same manner as in Example 1 except that the composite oxide A was mixed to be an amount at 20 mass % based on the total mass of the positive electrode active material.

Example 6

A non-aqueous electrolyte secondary battery was produced in the same manner as in Example 1 except that the composite oxide A was mixed to be an amount at 30 mass % based on the total mass of the positive electrode active material.

Example 7

A non-aqueous electrolyte secondary battery was produced in the same manner as in Example 1 except that the composite oxide A was mixed to be an amount at 55 mass % based on the total mass of the positive electrode active material.

Example 8

A non-aqueous electrolyte secondary battery was produced in the same manner as in Example 1 except that the composite oxide A was mixed to be an amount at 7 mass % based on the total mass of the positive electrode active material.

Example 9

A non-aqueous electrolyte secondary battery was produced in the same manner as in Example 1 except that the composite oxide A was mixed to be an amount at 60 mass % based on the total mass of the positive electrode active material.

Comparative Example 1

A non-aqueous electrolyte secondary battery was produced in the same manner as in Example 1 except that: no composite oxide A was used as the positive electrode active material (100% composite oxide B); a nickel-cobalt-manganese composite hydroxide having D50 of 14 μm with a composition of $Ni_{0.84}Co_{0.10}Mn_{0.06}(OH)_2$ was used in the production of the composite oxide B; and no Ti was mixed to synthesize the composite oxide.

Comparative Example 2

A non-aqueous electrolyte secondary battery was produced in the same manner as in Example 1 except that: no composite oxide A was used as the positive electrode active material (100% composite oxide B); only the lithium composite oxide having a larger average particle diameter (X2) and titanium oxide ($TiO_2$) were dry-mixed so that a molar ratio of the total amount of Ni, Co, and Mn, and Ti in $TiO_2$ was 1:0.02 in the production of the composite oxide B; and only the lithium composite oxide X3 having the composite of Ti on the particle surface was used (B2/B1=1.00).

Comparative Example 3

A non-aqueous electrolyte secondary battery was produced in the same manner as in Example 1 except that no composite oxide A was used as the positive electrode active material (100% composite oxide B).

A cycle test was performed on each of the batteries of Examples and Comparative Examples to evaluate a capacity maintenance rate. A filling density of the positive electrode mixture layer and a filling property of active material particles were also evaluated. The evaluation results are shown in Table 1. Table 1 shows: the metal elements added to the nickel-cobalt-manganese composite oxide (Me); the ratios (B2/B1) of a mole fraction of Me on the surfaces of the second particles (smaller particles) (B2) to a mole fraction of Me on the surfaces of the first particles (larger particles) (B1); and which of the first particle and second particle has a higher ratio of a mole fraction of Ti present on the particle surface to a mole fraction of Ti in an entirety of the particles (amount of LiMe/amount of Me in an entirety of the particles).

<Cycle Test>

Each of the batteries of Examples and Comparative Examples was charged at a constant current of 0.5 It until a battery voltage reached 4.2 V under a temperature environment of 60° C., and charged at a constant voltage of 4.2 V until a current value reached $\frac{1}{50}$ It. Then, the test cell was discharged at a constant current of 0.5 It until the battery voltage reached 2.5 V. This charge-discharge cycle was repeated 150 times.

[Evaluation of Capacity Maintenance Rate after Cycle Test]

On each of the batteries of Examples and Comparative Examples, a discharge capacity at the 1st cycle and discharge capacity at the 150th cycle in the cycle test were determined, and the capacity maintenance rate was calculated with the following formula.

$$\text{Capacity Maintenance Rate (\%)=(Discharge Capacity at 150th Cycle/Discharge Capacity at 1st Cycle)}\times 100$$

[Evaluation of Filling Property of Positive Electrode Mixture Layer]

On each of the positive electrodes produced in Examples and Comparative Examples, a 1-m, strip-shaped electrode plate for filling property evaluation (thickness of 200 μm) in which the mixture layer was formed on both surfaces was produced. This electrode plate was compressed using a rolling machine having a roller diameter of 750 mm (manufactured by Xingtai Naknor Technology Co., Ltd.) with changing a compressive condition (gap value), and after the compression, punched with a diameter of 40 mm. Table 1 shows a filling density of each electrode plate under a compressive condition under which an elongation of the electrode plate was 1%. In Table 1, a high filling density of the positive electrode mixture layer is shown as ○, and a low filling density is shown as x.

TABLE 1

| | Composite Oxide A (%) | Composite Oxide B B2/B1 | Amount of LiMeO/ Amount of Me in Entirety of Particles | Filling Density of Positive Electrode Mixture Layer (g/cc) | Filling Property of Active Material Particle | Capacity Maintenance Rate after Cycle Test (%) |
|---|---|---|---|---|---|---|
| Comparative Example 1 | None | — | — | 3.44 | x | 40 |
| Comparative Example 2 | None | 1.00 | — | 3.41 | x | 55 |
| Comparative Example 3 | None | 1.25 | — | 3.38 | x | 69 |

TABLE 1-continued

| | Composite Oxide A (%) | Composite Oxide B B2/B1 | Amount of LiMeO/ Amount of Me in Entirety of Particles | Filling Density of Positive Electrode Mixture Layer (g/cc) | Filling Property of Active Material Particle | Capacity Maintenance Rate after Cycle Test (%) |
|---|---|---|---|---|---|---|
| Example 1 | 50 | 1.25 | First Particle < Second Particle | 3.70 | ○ | 81 |
| Example 2 | 50 | 1.17 | First Particle < Second Particle | 3.67 | ○ | 84 |
| Example 3 | 50 | 1.31 | First Particle < Second Particle | 3.64 | Δ | 86 |
| Example 4 | 10 | 1.25 | First Particle < Second Particle | 3.66 | ○ | 80 |
| Example 5 | 20 | 1.25 | First Particle < Second Particle | 3.67 | ○ | 82 |
| Example 6 | 30 | 1.25 | First Particle < Second Particle | 3.67 | ○ | 83 |
| Example 7 | 55 | 1.25 | First Particle < Second Particle | 3.67 | ○ | 81 |
| Example 8 | 7 | 1.25 | First Particle < Second Particle | 3.59 | Δ | 76 |
| Example 9 | 60 | 1.25 | First Particle < Second Particle | 3.64 | Δ | 77 |

As shown in Table 1, any of the batteries of Examples has a higher capacity maintenance rate after the cycle test than the batteries of Comparative Examples, and has excellent charge-discharge cycle characteristics. The batteries of Examples have a better filling property of the active material particles in the positive electrode mixture layer than the batteries of Comparative Examples, and have a higher filling density of the mixture layer. In particular, a remarkable effect was obtained when a content rate of the composite oxide A was 10 to 55% (Examples 1 to 7).

REFERENCE SIGNS LIST

10 Non-aqueous electrolyte secondary battery
11 Positive electrode
12 Negative electrode
13 Separator
14 Electrode assembly
16 Exterior housing can
17 Sealing assembly
18, 19 Insulating plate
20 Positive electrode lead
21 Negative electrode lead
22 Grooved part
23 Internal terminal plate
24 Lower vent member
25 Insulating member
26 Upper vent member
27 Cap
28 Gasket
30 Positive electrode core
31 Positive electrode mixture layer

The invention claimed is:

1. A non-aqueous electrolyte secondary battery, comprising:
a positive electrode including a positive electrode active material;
a negative electrode; and
a non-aqueous electrolyte, wherein
the positive electrode includes: a lithium-transition metal composite oxide (A) having a median diameter on a volumetric basis (D50) of 0.6 μm to 3 μm and being a secondary particle formed by aggregation of primary particles having an average particle diameter of 0.5 μm or larger or being composed of substantially single particles; and a lithium-transition metal composite oxide (B) having a median diameter on a volumetric basis (D50) of 6 μm to 25 μm and being a secondary particle formed by aggregation of primary particles having an average particle diameter of 0.3 μm or smaller, as the positive electrode active material;
the lithium-transition metal composite oxide (A) contains 65 mol % or more of Ni based on a total number of moles of metal elements excluding Li, and Ti is not present on a particle surface of the lithium-transition metal composite oxide (A);
the lithium-transition metal composite oxide (B) contains 70 mol % or more of Ni based on a total number of moles of metal elements excluding Li, and Ti is present on a particle surface of the oxide; and
in the lithium-transition metal composite oxide (B), when particles having a particle diameter larger than a 70% particle diameter (D70) on a volumetric basis are defined as first particles, and particles having a particle diameter smaller than a 30% particle diameter (D30) on a volumetric basis are defined as second particles,
a mole fraction of Ti on surfaces of the second particles based on a total number of moles of metal elements excluding Li on surfaces of the second particles (B2) is larger than a mole fraction of Ti on surfaces of the first particles based on a total number of moles of metal elements excluding Li on surfaces of the first particles (B1), and
a ratio of the mole fraction of Ti on surfaces of the second particles (B2) to the mole fraction of Ti on surfaces of the first particles (B1) is 1.10 or more and 1.50 or less.

2. The non-aqueous electrolyte secondary battery according to claim 1, wherein a content rate of the lithium-transition metal composite oxide (A) based on a mass of the positive electrode active material is 20 to 55 mass %.

3. The non-aqueous electrolyte secondary battery according to claim 1, wherein the lithium-transition metal composite oxide (B) is a composite oxide represented by the general formula $Li_aNi_bCo_cMn_dTi_eO_f$, wherein $0.8 \leq a \leq 1.2$, $b \geq 0.70$, $c \leq 0.10$, $0.03 \leq d \leq 0.12$, $0.01 \leq e \leq 0.05$, $1 \leq f \leq 2$, and $b+c+d+e=1$.

4. The non-aqueous electrolyte secondary battery according to claim 1, wherein a density of a positive electrode mixture layer including the positive electrode active material is 3.55 g/cc or higher.

5. The non-aqueous electrolyte secondary battery according to claim 1, wherein a ratio of the mole fraction of Ti on the surfaces of the second particles (B2) to the mole fraction of Ti on the surfaces of the first particles (B1) is 1.2 or more and 1.50 or less.

6. The non-aqueous electrolyte secondary battery according to claim 1, wherein a volume ratio of the first particles (B1) to the second particles (B2) is about 1:1.

\* \* \* \* \*